(12) United States Patent
Tsukui et al.

(10) Patent No.: US 7,325,853 B2
(45) Date of Patent: Feb. 5, 2008

(54) ARRANGEMENT STRUCTURE OF UPPER COWL, SCREEN, AND METER FOR MOTORCYCLES

(75) Inventors: Hiroaki Tsukui, Saitama (JP); Takao Mikami, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/131,022

(22) Filed: Apr. 25, 2002

(65) Prior Publication Data

US 2002/0167191 A1 Nov. 14, 2002

(30) Foreign Application Priority Data

May 11, 2001 (JP) ............................. 2001-141097

(51) Int. Cl.
*B62J 17/04* (2006.01)
(52) U.S. Cl. .................. 296/78.1; 296/180.1
(58) Field of Classification Search ............. 296/180.1, 296/78.1, 91, 77.1, 181.5; 180/89.1; D12/182, D12/186, 114, 110
See application file for complete search history.

(56) References Cited

U.S. PATENT DOCUMENTS

| | | | |
|---|---|---|---|
| 3,787,088 A | | 1/1974 | Dreyer, Sr. |
| 4,198,093 A | * | 4/1980 | Muth et al. ................. 296/78.1 |
| D266,321 S | * | 9/1982 | Morioka et al. ........... D12/182 |
| 4,515,405 A | | 5/1985 | Ogishima |

(Continued)

FOREIGN PATENT DOCUMENTS

DE 297 10 158 U 8/1997

(Continued)

OTHER PUBLICATIONS

"The Best of the Best: Part One", Jan. 1998, Motorcycle Online, printed from the Internet, Nov. 2, 2002.*

(Continued)

*Primary Examiner*—Jason S Morrow
(74) *Attorney, Agent, or Firm*—Birch, Stewart, Kolasch & Birch, LLP (57) ABSTRACT

In a motorcycle, an increase in the wedge effect of the upper cowl occurs with respect to the wind buffeted thereto during travel for reducing wind drag while maintaining continuity of the upper surface of the screen with respect to the upper surface of the head of the rider in a fully bent posture while providing a meter with high visibility even for the rider in a fully bent posture. In a motorcycle wherein the upper surface of the upper cowl covers the upper end portion of the front fork and is formed into a convex surface with a backward rising gradient a screen is provided having an upper surface formed into a convex shape with a backward rising gradient mounted on the upper cowl around the periphery of an open-rear notch for mounting the screen. A meter is disposed inside the upper cowl and the screen. The backward rising gradient α of the upper surface of the upper cowl at the rear edge is determined to be smaller than the backward rising gradient β of the upper surface of the screen at the front edge and the display surface of the meter is disposed vertically across the boundary B between the upper cowl and the screen in side view.

22 Claims, 5 Drawing Sheets

U.S. PATENT DOCUMENTS

| | | | |
|---|---|---|---|
| 5,147,077 A * | 9/1992 | Nakajima et al. | 224/413 |
| 5,330,029 A * | 7/1994 | Yoshimura et al. | 180/219 |
| 5,577,570 A * | 11/1996 | Shiohara et al. | 180/219 |
| D401,184 S * | 11/1998 | Tsukui et al. | D12/110 |
| 5,911,466 A * | 6/1999 | Hoshi et al. | 296/78.1 |
| 6,060,985 A * | 5/2000 | Siviero | 340/461 |
| D439,552 S * | 3/2001 | Tsukui et al. | D12/110 |
| D444,420 S * | 7/2001 | Takeshita et al. | D12/110 |
| 6,276,482 B1 * | 8/2001 | Moriya et al. | 296/78.1 |
| D457,836 S * | 5/2002 | Kohama et al. | D12/110 |
| 2001/0028176 A1 * | 10/2001 | Suzuki et al. | 296/70 |
| 2002/0041107 A1 * | 4/2002 | Takemura et al. | 296/78.1 |
| 2002/0153187 A1 * | 10/2002 | Tsukui et al. | 180/219 |

FOREIGN PATENT DOCUMENTS

| | | | |
|---|---|---|---|
| JP | 63-032983 U | | 3/1988 |
| JP | 63-32983 U | | 3/1988 |
| JP | 2001-048078 A | | 2/2001 |
| JP | 2001-080561 A | | 3/2001 |
| JP | 2001080561 | * | 3/2001 |

OTHER PUBLICATIONS

"Honda VTR100F Super Hawk", by Tom Fortune, 1997, Motorcycle Online, printed from the Internet, Nov. 2, 2002.*

"Overlooked and Underrated", by the Motorcycle Online Staff, Jan. 18, 2000, Motorcycle Online, printed from the Internet, Nov. 2, 2002.*

Abstract for DE 29710158.*

"The Art of Speed", 1998, Fast by Ferracci catalog, pp. 45 and 2.*

* cited by examiner

FIG. 5

ARRANGEMENT STRUCTURE OF UPPER COWL, SCREEN, AND METER FOR MOTORCYCLES

CROSS-REFERENCE TO RELATED APPLICATIONS

The present application claims priority under 35 USC 119 to Japanese Patent Application No. 2001-141097 filed on May 11, 2001 the entire contents thereof is hereby incorporated by reference.

1. Field of the Invention

The present invention relates to an arrangement structure of an upper cowl, screen, and a meter suitable for sport-type motorcycles. More specifically, to an improvement of an arrangement structure of the upper cowl, screen, and meter for motorcycles in which the upper surface of the upper cowl for covering the upper end portion of the front fork that supports the steering handle is formed into a convex surface with a backward rising gradient. A screen includes an upper surface formed into a convex shape with a backward rising gradient that is mounted on the upper cowl around the periphery of the open-rear notch for mounting the screen. A meter includes a display surface facing in the upper rear direction for mounting on the vehicle body frame and being disposed on an inner side of the upper cowl and the screen.

2. Description of Background Art

Such an arrangement structure of upper cowl, screen, and meter for motorcycles is disclosed, for example, in Japanese Utility Model Laid-Open No. 32983/1988.

Motorcycles of the related art include upper surfaces of the upper cowl and the screen that are formed in a continuous convex surface, the entire upper surface of the upper cowl and the screen have a relatively steep backward rising gradient in order to continuate the upper surface of the screen and the upper surface of the head of the rider in the fully bent posture. The meter is disposed within the range of the upper cowl.

However, when the entire upper surface of the upper cowl and the screen is given a steep backward rising gradient as described above, the wedge effect of the upper cowl with respect to the wind buffeted thereon during travel decreases, thereby increasing wind drag.

SUMMARY AND OBJECTS OF THE INVENTION

With such circumstances in view, it is an object of the present invention to provide an arrangement structure of a front cowl, screen, and meter for motorcycles in which the wedge effect of the upper cowl with respect to the wind buffeted thereon during travel increases and thus wind drag is reduced while maintaining continuity of the upper surface of the screen with respect to the upper surface of the head of the rider in the fully bent posture. In addition, the meter is positioned so that a rider in a fully bent posture can easily view the meter.

In order to achieve the aforementioned object, the present invention provides an arrangement structure of an upper cowl, screen and meter for motorcycles, in which the upper surface of the upper cowl for covering the upper end portion of the front fork that supports the steering handle is formed into a convex surface with a backward rising gradient. A screen is provided having an upper surface formed into a convex shape with a backward rising gradient. The screen is mounted on the upper cowl around the periphery of an open-rear notch for mounting the screen. A meter is provided having a display surface facing toward the back, upper side for mounting on the vehicle body frame. The meter is disposed inside the upper cowl and the screen. The backward rising gradient of the upper surface of the upper cowl at the rear edge including the notch is determined to be smaller than the backward rising gradient of the upper surface of the screen at the front edge. The display surface of the meter is disposed vertically across the boundary between the upper cowl and the screen in a side view.

According to the present invention, when the rider is fully bent down and places his head near the rear edge of the screen during operation of the motorcycle, the upper cowl having a convex upper surface with a relatively gentle backward rising gradient preferably creates the wedge effect with respect to the wind buffeted thereon during travel and thus contributes to reduce wind drag. Since the convex upper surface of the screen includes a relatively steep backward rising gradient that has continuity with respect to the upper surface of the head of the rider, the wind streaming rearwardly along the upper surface of the screen is transferred to the upper surface of the head of the rider smoothly, which also contributes to a reduction of the wind drag. Therefore, wind drag of the entire motorcycle including a rider is effectively reduced. Thus, the maximum vehicle speed may be increased. In addition, the display surface of the meter disposed vertically across the boundary between the upper cowl and the screen in side view can easily be viewed by the rider in a fully bent posture with the visibility thereof being satisfactory.

The present invention provides a meter that includes a trapezoidal portion the lateral width of which decreases toward the front. The meter is disposed in such a manner that at least a part of the trapezoidal portion is positioned in an arcuate space enclosed by the inner surface of the screen and a straight line passing between the left and right ends of the inner surface.

According to the present invention, even when a relatively large meter with high visibility is employed, it can be disposed near the inner surface of the screen, and a space for allowing the rotation of a top bridge of the front fork can easily be defined between the meter and the top bridge of the front fork.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to the attached drawings, one embodiment of the present invention will be described.

Figure 1:
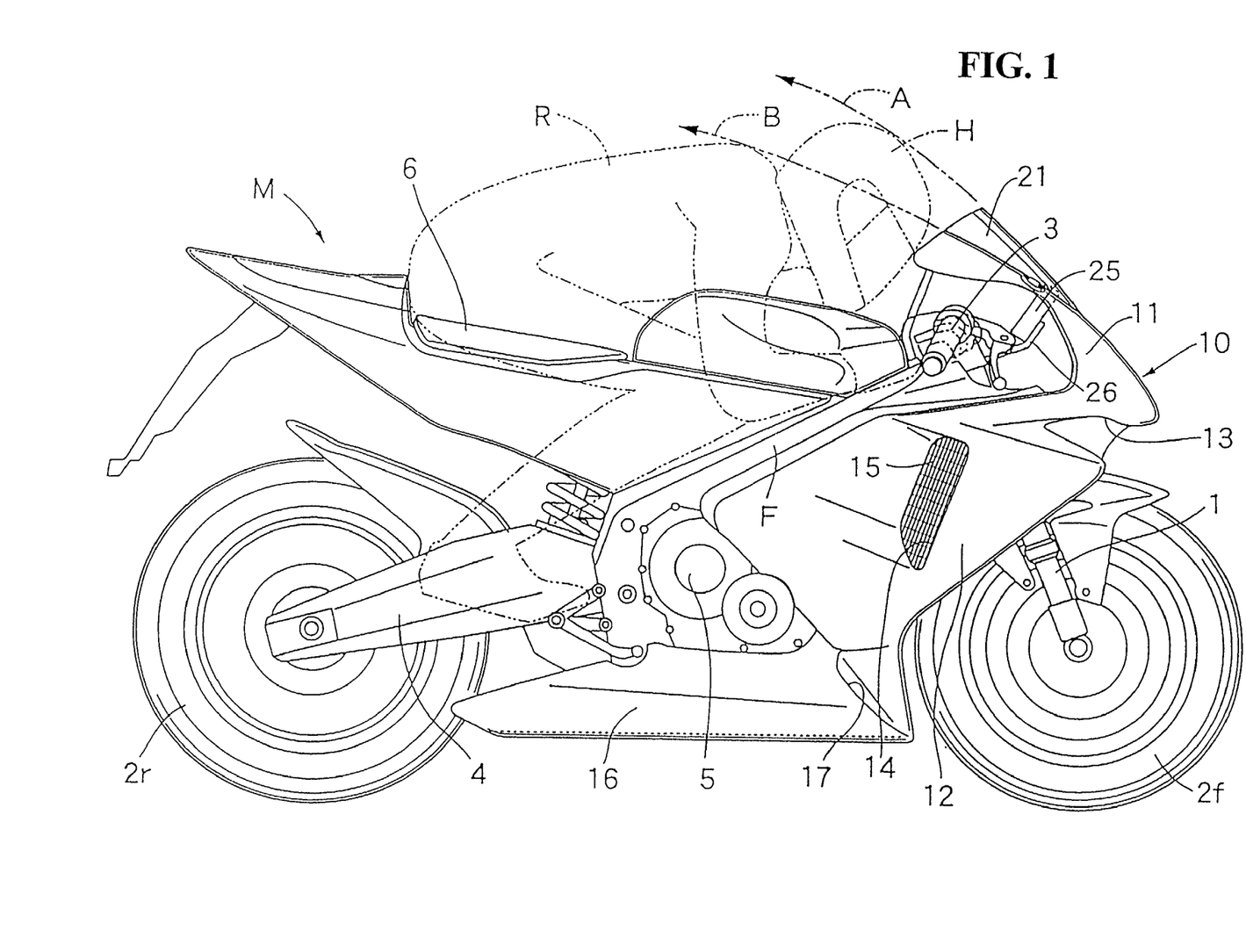
FIG. 1 is a side view of the motorcycle according to the present invention.
Figure 2:
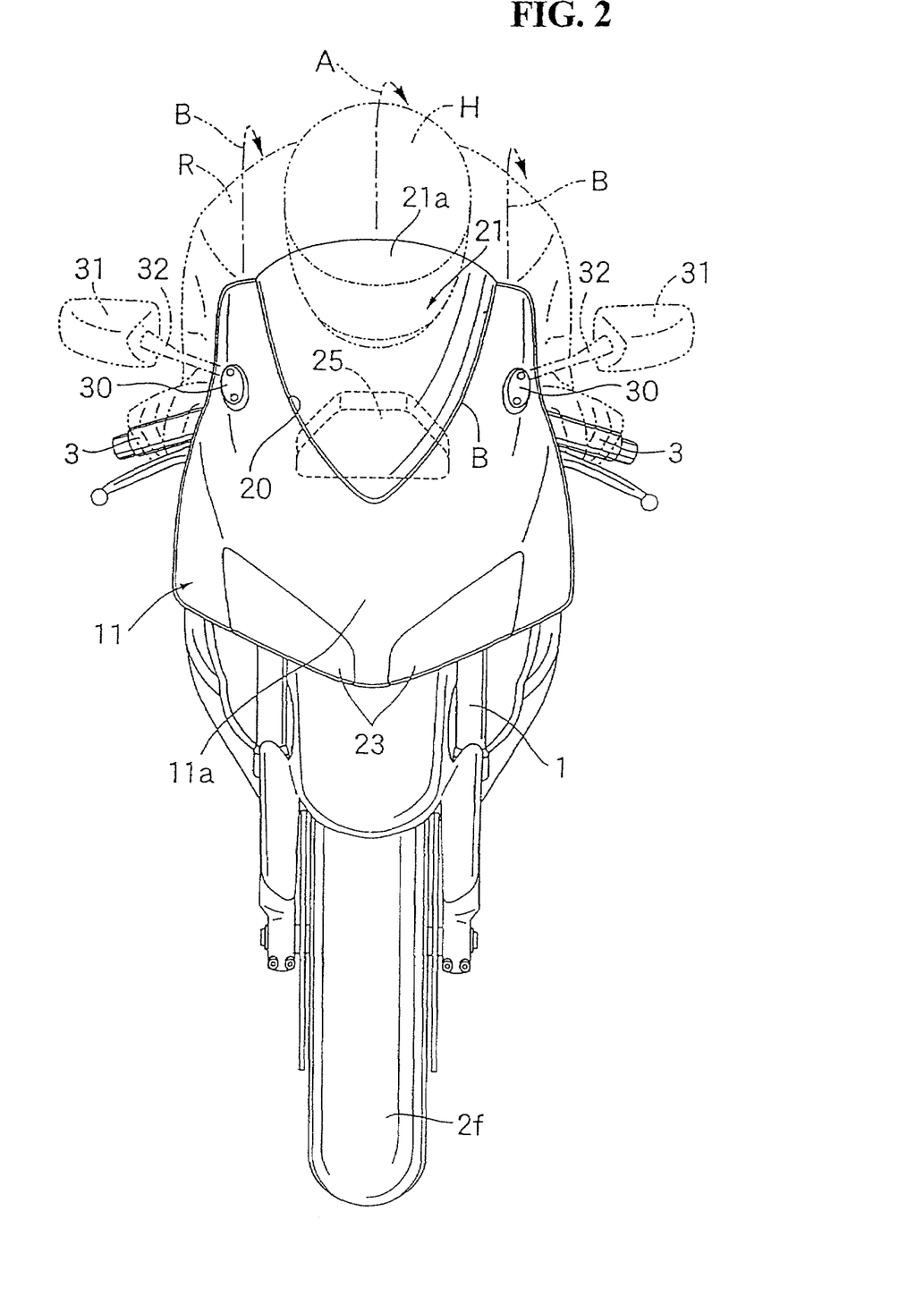
FIG. 2 is a front view of the motorcycle illustrated in FIG. 1.
Figure 3:
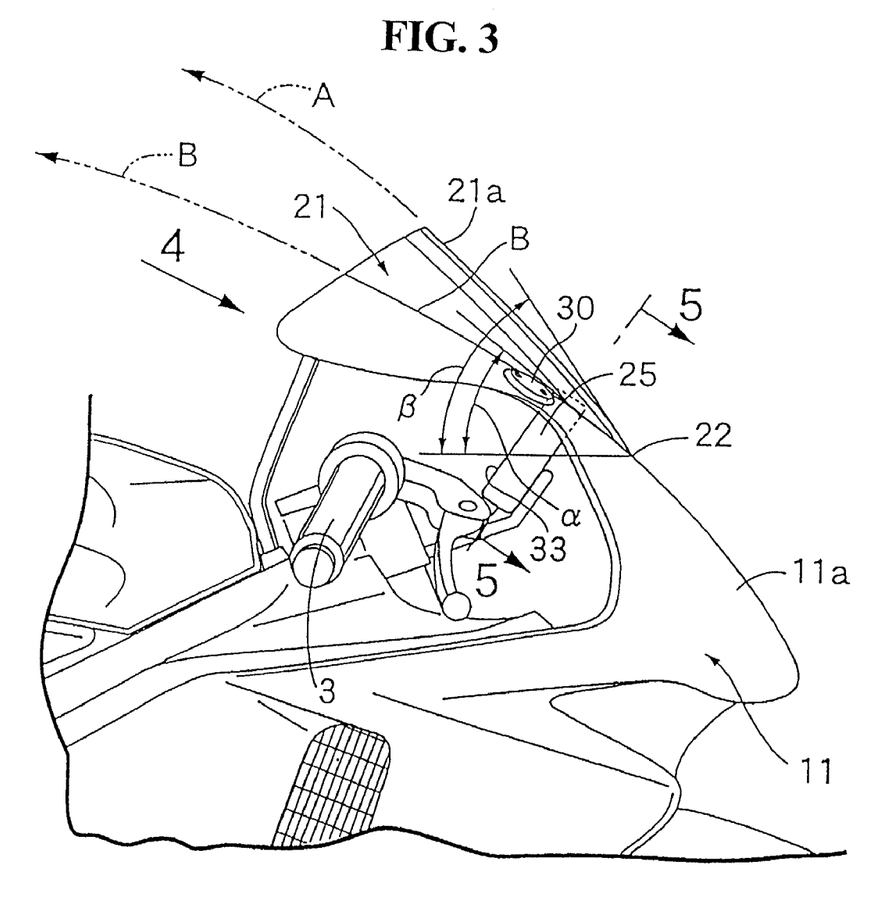
FIG. 3 is a partially enlarged view of FIG. 1.

Referring now FIGS. 1, 2. 4, and 5, a front fork 1 for rotatably supporting the front wheel 2f is connected to the front end of the vehicle body frame F of the motorcycle M for steering the vehicle. Right and left steering handles 3, 3 are mounted on the upper end portions right and left legs 1a, 1a of the front fork 1. A top bridge 7 extends in a V-shaped manner from the vehicle body frame F (at a longitudinal center of the vehicle) to the right and left legs 1a, 1a of the front fork 1 (See FIGS. 4 and 5). FIG. 1 illustrates a rear fork 4 for rotatably supporting the rear wheel 2r is attached to the rear end portion of the vehicle body frame for pivotal movement in the vertical direction. An engine 5 for driving the rear wheel 2r is mounted on the central portion of the vehicle body frame. Above the engine 5 a seat 6 is provided which is straddled by the rider R. FIGS. 1 and 3 show a meter 25 mounted on the vehicle body frame F via stay 26. Stay 26 extends in an upwardly sloping direction from the vehicle body frame F and then bends upwardly to extends along a back side of the meter 25.

In addition, a front cowl 10 is mounted on the vehicle body frame. The front cowl 10 comprises an upper cowl 11 for covering the upper end portion of the front fork 1 from the front, and a lower cowl 12 connected to the lower end of the upper cowl 11 for covering the left and right sides of the area from the center portion of the front fork 1 to the engine 5.

A cooling air inlet 13 is disposed between the upper cowl 11 and the lower cowl 12, and a cooling air discharge port 14 to which the radiator 15 of the engine 5 is facing is disposed between the left and right side walls of the lower cowl 12, so that air introduced into the cooling air inlet 13 cools the radiator 15 down and is discharged from the cooling air discharge port 14.

The engine 5 is attached with an engine undercover 16 for covering the under surface thereof and forming a cooling air passage 17 with respect to the lower surface of the engine 5.

As shown in FIG. 1 to FIG. 3, the upper surface of the upper cowl 11 is formed into a convex surface 11a with a backward rising gradient. The upper cowl 11 is formed with a V-shaped, or U-shaped open-front notch 20 for mounting the screen. A transparent screen 21 is mounted around the periphery of the notch 20. The upper surface of the screen 21 is also formed into a convex surface 21a with a backward rising gradient.

Especially, the backward rising gradient of the convex surface 11a forming the upper surface of the upper cowl 11 is determined to be as gentle as possible in order to increase the wedge effect of the upper cowl 11 with respect to the wind buffeted thereon during travel. On the other hand, the backward rising gradient of the convex surface 21a forming the upper surface of the screen 21 is determined to be relatively steep in order to continue the convex surface 21a and the upper surface of a helmet H when the rider R takes a fully bent posture in which his upper body is bent to the almost horizontal position to bring the helmet H on his head closer to the rear edge of the screen 21 (See FIG. 1). As a consequence, the backward rising gradient a of the upper surface of the upper cowl 11 at the rear edge having the notch 20 is determined to be smaller than the backward rising gradient β of the upper surface of the screen 21 at the front edge. Thus, as can be seen in FIG. 3, a shallow trough 22 is formed at the juncture between the upper surfaces 11a, 21a. Additionally, as can be seen by referring to the side views of the motorcycle shown in FIGS. 1 and 3. the meter 25 is mounted on stay 26 such that a horizontal line extending rearwardly from the lower most part of shallow trough 22 intersects a mid section of the meter 25. As such, an upper half of the meter 25 is disposed higher in a vertical direction than the horizontal line extending through the shallow trough 22. and a lower half of the meter 25 and the upper most portion of the stay 26 are disposed in a vertical direction below the horizontal line. As a consequence, as shown in FIG. 1 and FIG. 2, the backward extension A of the upper surface of the screen 21 passes near the apex of the helmet H of the rider R in a fully bent posture, and the backward extension B of the upper surface of the upper cowl 11 passes near the apex of the shoulder of the rider R in a fully bent posture.

As clearly shown in FIG. 2, a pair of left and right headlamps 23 are mounted on the front end portion of the upper cowl 11, and the front surfaces thereof is formed so as to continue to the front surface of the upper cowl 11.

Figure 4:
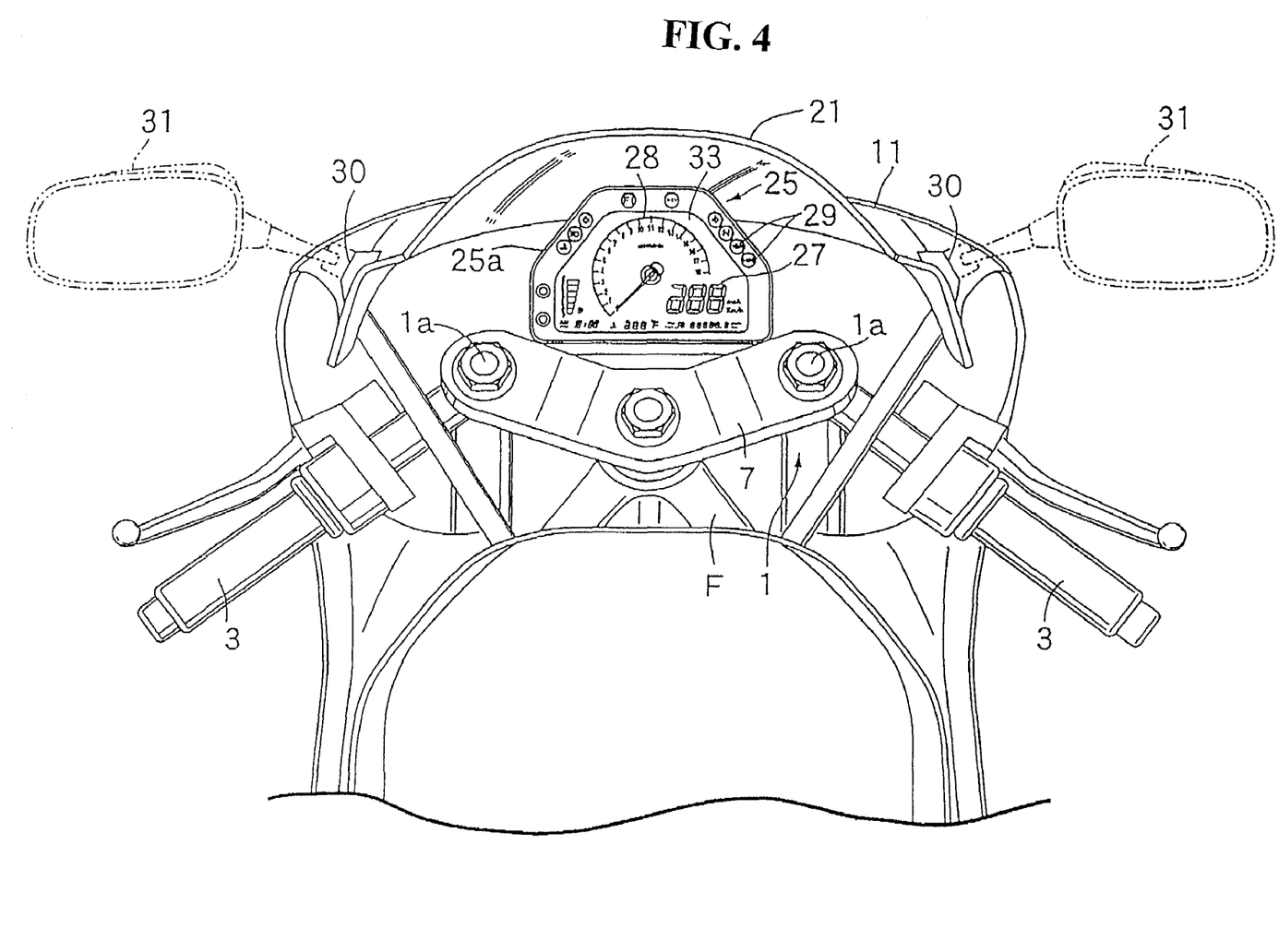
FIG. 4 is a drawing viewed in the direction illustrated by the arrow 4 in FIG. 3.
Figure 5:
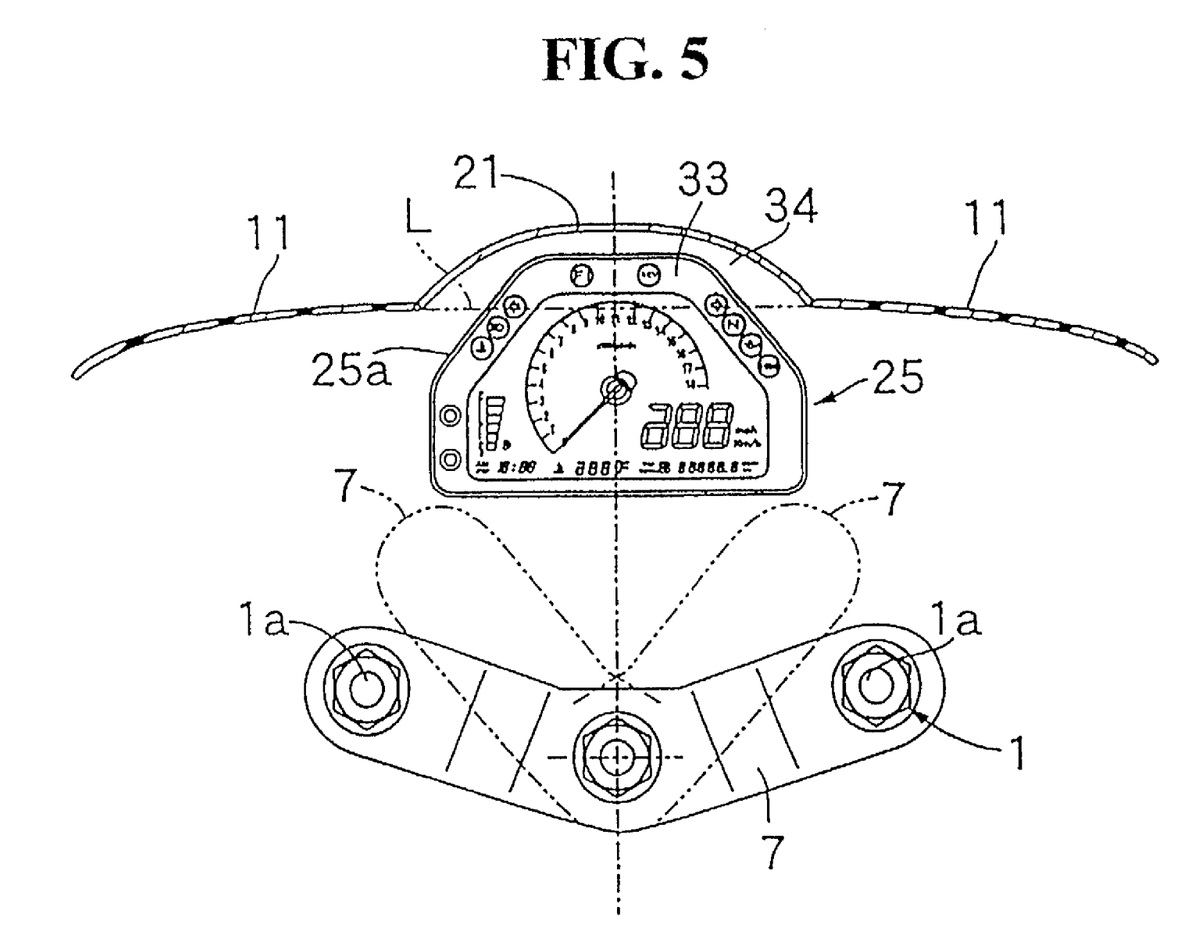
FIG. 5 is a cross sectional view taken along the line 5-5 in FIG. 3.

In FIG. 3 to FIG. 5, the meter 25 is mounted on the vehicle body frame F for supporting the front fork 1 inside the upper cowl 11 and the screen 21 via a stay 26 In this case, the display surface 33 faces in the upper rear direction and is disposed vertically across the boundary B between the upper cowl 11 and the screen 21 in a side view in order to increase the visibility of the display surface 33 for the rider R even when the rider R assumes the fully bent posture. The display surface 33 of the meter 25 is provided with a digital speed display 27, an analogue engine revolution display 28, and other various warning displays 29.

As is clearly shown in FIGS. 4 and 5, the front half of the meter 25 is formed into a trapezoidal shape 25a with the lateral width decreasing toward the front. The meter 25 is positioned in such a manner that a part or the entire portion of the trapezoidal portion 25a is positioned in the arcuate space 34 enclosed by the inner surface of the screen 21 and the straight line L passing between the left and right ends of the inner surface. As can be seen in FIG. 4. the from the view of rider R. at least a lower portion of the meter 25 is disposed between the ends of the V-shaped top bridge 7. Further, as can be seen in FIG. 5, a space for allowing the rotation of the V-shaped top bridge 7 is defined between the meter 25 and the V-shaped top bridge 7 for connecting the upper ends of the left and right legs 1a, 1a of the front fork 1.

Referring back to FIG. 1 and FIG. 2, a pair of mounting seats 30 are formed on the upper surface of the left and right side portions of the upper cowl 11 with the mirror stays 32 for supporting the back mirrors 31 being mounted thereon. However, the back mirrors 31 may be removed when the motorcycle M participates in the race.

The action of this embodiment will be described below. During operation of the motorcycle M, when the rider R assumes a fully bent posture as shown in FIG. 1 and brings his helmet H closer to the rear edge of the screen 21, the upper cowl 11 having an upper surface 11a formed into a convex shape with a relatively gentle backward rising gradient creates a satisfactory wedge effect with respect to the wind buffeted thereon during travel, and the wind streaming along the upper surface of the upper cowl 11 during travel passes near the apex of the shoulder of the rider R along the extension B. Thus, wind drag may be reduced.

Since the convex upper surface 21a with a relatively steep backward rising gradient of the screen 21 has continuity with respect to the upper surface of the helmet H, the wind streaming on the upper surface 21a of the screen 21 rearwardly during travel may be transferred smoothly to the upper surface of the helmet H along the extension A without any significant turbulence. The wind stream proceeds along the back of the rider R to the rear, which may also reduce wind drag. As a result, wind drag of the entire motorcycle M including the rider R effectively reduces, thereby increasing the maximum vehicle speed.

Since the display surface 33 of the meter 25 is disposed inside the upper cowl 11 and the screen 21 faces in the rising and is arranged at the position vertically across the boundary B of the upper cowl 11 and the screen 21 in side view, the rider R can view the display surface 33 easily in the fully bent posture. Thus, the rider R can accurately know the driving information such as vehicle speed, engine revolutions, and the like.

Since the meter 25 is disposed in such a manner that a part or the entire portion of the trapezoidal portion 25a at the front half thereof is positioned in the arcuate space 34 inside the screen 21, even when a relatively large meter 25 with high visibility is employed, it can be disposed near the inner surface of the screen 21. A space is provided for allowing the rotation of the top bridge 7 of the front fork which can easily be defined between the meter 25 and the top bridge 7 of the front fork.

The present invention is not limited to the aforementioned embodiment, and various modifications in design are possible without departing from the scope of the invention. For example, the meter 25 may be supported by the front cowl 10 and secured indirectly to the vehicle body frame F.

As described above, according to the present invention, in an arrangement structure of an upper cowl, screen and meter for motorcycles, in which the upper surface of the upper cowl for covering the upper end portion of the front fork that supports the steering handle is formed into a convex surface with a backward rising gradient, a screen is provided that has an upper surface formed into a convex shape with a backward rising gradient that is mounted on the upper cowl around the periphery of an open-rear notch for mounting the screen. A meter includes a display surface facing toward the back, upper side for being mounted on the vehicle body frame that is disposed on the inner side of the upper cowl and the screen. Since the backward rising gradient of the upper surface of the upper cowl at the rear edge includes the notch that is determined to be smaller than the backward rising gradient of the upper surface of the screen at the front edge and the display surface of the meter is disposed vertically across the boundary between the upper cowl and the screen in a side view, when the rider is fully bent down and place his head near the rear edge of the screen during racing of the motorcycle, the upper cowl having a convex upper surface with a relatively gentle backward rising gradient creates preferably a wedge effect with respect to the wind buffeted thereon during travel and thus contributes to reduce wind drag. The convex upper surface of the screen having a relatively steep backward rising gradient transfers the wind streaming rearwardly along the upper surface of the screen to the upper surface of the head of the rider smoothly, which also contributes to a reduction of the wind drag. Thus, the wind drag of the entire motorcycle including the rider is effectively reduced and the maximum vehicle speed is increased. In addition, the display surface of the meter disposed vertically across the boundary between the upper cowl and the screen in a side view can easily be viewed by the rider in a fully bent posture, and thus visibility thereof is satisfactory.

Accordingly, the present invention provides a meter having a trapezoidal portion the lateral width of which decreases toward the front. The meter is disposed in such a manner that at least a part of the trapezoidal portion is positioned in an arcuate space enclosed by the inner surface of the screen and a straight line passing between the left and right ends of the inner surface. Thus, even when a relatively large meter with high visibility is employed, it can be disposed near the inner surface of the screen. A space for allowing the rotation of a top bridge of the front fork can easily be defined between the meter and the top bridge of the front fork.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An arrangement structure of an upper cowl, screen and meter for motorcycles, wherein:

the upper cowl is positioned to cover an upper end portion of a front fork for supporting a steering handle, said upper cowl having an upper surface formed into a convex surface;

the screen having an upper surface formed by a single smooth arcuate curve providing the screen with a concave-shaped inner face, said screen being mounted on the upper cowl adjacent to the periphery of an open-rear notch for mounting the screen; and a meter having a display surface, the display surface including a circular engine revolution display and a digital speed display, wherein the meter is mounted on a vehicle body frame (F) so that an upper portion of the circular engine revolution display of the meter is disposed vertically across a boundary (L) between the upper cowl and the screen in side view, and wherein a center and an uppermost part of the circular engine revolution display and a center of the concave-shaped inner face of the screen are disposed on a centerline of the vehicle body frame (F), whereby the circular engine revolution display is disposed so as to be easily viewed by a rider, wherein a shallow trough is formed at a juncture between the screen and the upper cowl, the meter being mounted such that a horizontal line extending rearwardly from the lower most part of shallow trough intersects a mid section of the meter, and when viewed from a side of the motorcycle, an upper half of the meter is disposed higher in a vertical direction than the horizontal line extending through the shallow trough, and a lower half of the meter is disposed in a vertical direction below the horizontal line.

2. The arrangement structure of upper cowl, screen and meter for motorcycles according to claim 1, wherein the meter includes a trapezoidal portion with a lateral width that decreases toward a front portion and the meter is disposed in such a manner that at least a part of the trapezoidal portion is positioned in an arcuate space enclosed by the inner surface of the screen and a straight line (L) passing between the left and right ends of the inner surface.

3. The arrangement structure of upper cowl, screen and meter for motorcycles according to claim 1, and further including a lower cowl operatively connected to said upper cowl, said lower cowl covering left and right sides on an area extending from a central portion of the front fork to an engine.

4. The arrangement structure of upper cowl, screen and meter for motorcycles according to claim 3, and further including an air cooling inlet operatively positioned between the upper cowl and the lower cowl and a discharge port positioned downstream from the air cooling inlet, a radiator being disposed between said air cooling inlet and said discharge port.

5. The arrangement structure of upper cowl, screen and meter for motorcycles according to claim 1, wherein said upper cowl is formed with a V-shape open front notch for mounting the screen relative to said upper cowl.

6. The arrangement structure of upper cowl, screen and meter for motorcycles according to claim 1, wherein said upper cowl is formed with a U-shaped open front notch for mounting the screen relative to said upper cowl.

7. The arrangement structure of upper cowl, screen and meter for motorcycles according to claim 1, wherein a backward rising gradient of the upper cowl has a gradual incline as compared to a backward rising gradient of the screen which is relatively steep relative thereto.

8. The arrangement structure of upper cowl, screen and meter for motorcycles according to claim 1, wherein a rearward extension of the upper surface of the screen is disposed to be adjacent to a helmet of an operator of the motorcycle and a rearward extension of the upper surface of the upper cowl is disposed to be adjacent to a shoulder portion of an operator of the motorcycle.

9. A wind drag reduction arrangement adapted to be used with motorcycles comprising:
an upper cowl including an upper surface adapted to cover an upper end portion of a front fork for supporting a steering handle, said upper surface being formed into a convex surface;
a screen operatively mounted relative to the upper cowl, said screen having an upper surface formed by a second single smooth arcuate curve providing said screen with a convex-shaped outer face and a concave-shaped inner face, said screen being mounted on the upper cowl adjacent to the periphery of an open-rear notch for mounting the screen; and
a meter having a display surface, the display surface including a circular engine revolution display and a digital speed display, the circular engine revolution display being centered on the meter,
wherein the meter is mounted on a vehicle body frame (F) so that an upper portion of the circular engine revolution display of the meter is disposed vertically across a boundary (L) between the upper cowl and the screen in side view, and
wherein a center and an uppermost part of the circular engine revolution display are disposed directly under a center of the concave-shaped inner face of the screen, the center of the circular engine revolution display is thereby being disposed on a centerline of the vehicle body frame (F), whereby the circular engine revolution display is disposed so as to be easily viewed by a rider,
wherein a shallow tough is formed at a juncture between the screen and the upper cowl,
the meter being mounted such that a horizontal line extending rearwardly from the lower most part of shallow trough intersects a mid section of the meter, and when viewed from a side of the motorcycle, an upper half of the meter is disposed higher in a vertical direction than the horizontal line extending through the shallow trough, and a lower half of the meter is disposed in a vertical direction below the horizontal line.

10. The wind drag reduction arrangement according to claim 9, wherein the meter has a trapezoidal portion with a lateral width that decreases toward a front portion, the meter being disposed in such a manner that at least a part of the trapezoidal portion is positioned in an arcuate space enclosed by the inner surface of the screen and a straight line (L) passing between left and right ends of the inner surface.

11. The wind drag reduction arrangement according to claim 9, further including a lower cowl operatively connected to said upper cowl, said lower cowl covering left and right sides on an area extending from a central portion of the front fork to an engine.

12. The wind drag reduction arrangement according to claim 11, further including an air cooling inlet operatively positioned between the upper cowl and the lower cowl, a discharge port positioned downstream from the air cooling inlet, and a radiator disposed between said air cooling inlet and said discharge port.

13. The wind drag reduction arrangement according to claim 9, wherein said upper cowl is formed with a V-shaped open front notch for mounting the screen relative to said upper cowl.

14. The wind drag reduction arrangement according to claim 9, wherein said upper cowl is formed with a U-shaped open front notch for mounting the screen relative to said upper cowl.

15. The wind drag reduction arrangement according to claim 9, wherein a backward rising gradient of the upper cowl has a gradual incline as compared to a backward rising gradient of the screen which is relatively steep relative thereto.

16. The wind drag reduction arrangement according to claim 9, wherein a rearward extension of the upper surface of the screen is disposed adjacent to a helmet of an operator of the motorcycle, and the rearward extension of the upper surface of the upper cowl is disposed adjacent to a shoulder portion of said operator.

17. The arrangement structure of upper cowl, screen and meter for motorcycles according to claim 1, when facing the display surface of the meter, the meter including a lower part that is substantially rectangular-shaped and an upper part that is substantially trapezoidal-shaped, wherein the meter is mounted on the centerline of the vehicle body frame (F) so that at least a part of the trapezoidal-shaped upper part extends upwardly into an arcuate space formed under the concave-shaped inner face of the screen,
the circular engine revolution display being centered in a lateral direction on the display surface of the meter, whereby an upper portion of the circular engine revolution display of the meter is disposed vertically across a straight line (L) between right and left ends of the concave-shaped inner face of the screen when viewed from a rear direction, thereby increasing visibility of the circular engine revolution display.

18. The arrangement structure of upper cowl, screen and meter for motorcycles according to claim 1,
wherein a space is provided between the meter and a V-shaped top bridge, so that ends of the V-shaped top bridge do not impact the meter during rotation of the V-shaped top bridge relative the vehicle body frame (F) while turning the steering handle.

19. The arrangement structure of upper cowl, screen and meter for motorcycles according to claim 1, wherein a rearward extension of the upper surface of the upper cowl extends further rearwardly than substantially all portions of a steering handle when the motorcycle is traveling straight ahead.

20. The arrangement structure of upper cowl, screen and meter for motorcycles according to claim 1, wherein a stay extends in an upwardly sloping direction from the vehicle body frame (F) and then bends further upwardly so as to extend part way along a back side of the meter.

21. The arrangement structure of upper cowl, screen and meter for motorcycles according to claim 9, further comprising a V-shaped top bridge for connecting the vehicle body frame (F) to right and left legs of the front fork, wherein a space is provided between the meter and the V-shaped top bridge, so that ends of the V-shaped top bridge do not impact the meter during rotation of the V-shaped top bridge relative the vehicle body frame (F) while turning the steering handle.

22. The arrangement structure of upper cowl, screen and meter for motorcycles according to claim 9, wherein at least a lower portion of the meter is disposed between two ends of a V-shaped top bridge when viewed from a view of a rider R.

* * * * *